United States Patent
Hung

(10) Patent No.: US 7,599,045 B2
(45) Date of Patent: Oct. 6, 2009

(54) METHOD FOR ELIMINATING INTERNAL REFLECTION OF RANGE FINDING SYSTEM AND RANGE FINDING SYSTEM APPLYING THE SAME

(75) Inventor: Chih-wei Hung, Tantz Shiang (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 12/037,857

(22) Filed: Feb. 26, 2008

(65) Prior Publication Data

US 2008/0143998 A1 Jun. 19, 2008

Related U.S. Application Data

(63) Continuation-in-part of application No. 11/339,379, filed on Jan. 25, 2006, now abandoned.

(51) Int. Cl.
*G01C 3/08* (2006.01)
(52) U.S. Cl. .................. 356/4.01; 356/5.01; 359/399
(58) Field of Classification Search .............. 356/4.01
See application file for complete search history.

(56) References Cited

U.S. PATENT DOCUMENTS

| 5,430,290 | A * | 7/1995 | Merle et al. ............... 250/208.1 |
| 5,771,623 | A * | 6/1998 | Pernstich et al. .............. 42/115 |
| 6,512,574 | B2 * | 1/2003 | Lai et al. .................... 356/4.01 |
| 2006/0181694 | A1 * | 8/2006 | Hung ........................ 356/4.01 |

* cited by examiner

*Primary Examiner*—Thomas H Tarcza
*Assistant Examiner*—Timothy A Brainard

(57) ABSTRACT

A method for eliminating internal reflection signal in a range finding system is disclosed, including the steps of receiving a range-finding signal reflected by an object and an internal reflection signal caused by internal reflection of the range finding system, converting the range finding signal and internal reflection signal, as a combination, into an electrical current signal, cropping the electrical current signal in a time interval for the electrical current signal to pass so as to generate a first electrical signal indicating the internal reflection signal, and subtracting the first electrical signal from the current signal to provide a second electrical signal representing the range-finding signal reflected by the object.

16 Claims, 4 Drawing Sheets

METHOD FOR ELIMINATING INTERNAL REFLECTION OF RANGE FINDING SYSTEM AND RANGE FINDING SYSTEM APPLYING THE SAME

CROSS-REFERENCE TO RELATED APPLICATIONS

The present application is a continuation-in-part of U.S. patent application Ser. No. 11/339,379, entitled "METHOD FOR ELIMINATING INTERNAL REFLECTION OF RANGE FINDING SYSTEM AND RANGE FINDING SYSTEM APPLYING THE SAME", filed on Jan. 25, 2006.

BACKGROUND OF THE INVENTION

1. Field of the Invention

The present invention relates generally to a method for eliminating internal reflection of range finding systems, and more particularly to a method for eliminating internal reflection occurring in a laser sight.

2. Description of the Prior Art

A conventional laser sight generally comprises a range finding system comprising an object lens, an eyepiece, an erecting system, a laser transmitter, a transmitting prism, a laser receiver, and a receiving prism. An example of the conventional laser sight is disclosed in U.S. Pat. No. 5,771,623. In operation, the laser transmitter transmits, at a first time point, a transmission light beam to an object, and then the laser receiver receives a reflection light beam that is reflected by the object at a second time point. The distance between the laser sight and the object can be obtained by multiplying the light speed with the time difference between the second and first time points.

FIG. 1 of the attached drawings shows a range finding system 90 of the conventional laser sight. The laser range-finding system 90 comprises a laser transmitter 93, a transmitting prism 94, an object lens 95, a receiving prism 96, and a laser receiver 97. The laser transmitter 93, the transmitting prism 94, and the object lens 95 are arranged on a transmitting beam path 91. The object lens 95, the receiving prism 96, and the laser receiver 97 are arranged on a receiving beam path 92. The laser transmitter 93 transmits a light beam to the transmitting prism 94. The prism 94 redirects the light beam toward an object (not shown) through the object lens 95. The light beam is then reflected by the object back to the receiving prism 96 through the object lens 95, and is redirected to the laser receiver 97 by the receiving prism 96. However, since the transmitting beam path 91 and the receiving beam path 92 are coincident with each other (or in other words, they are coaxial), internal reflection of the transmitting light occurring along the transmitting beam path 91 is also received by the receiver 97. For example, when the light beam generated by the laser transmitter 93 is shot at the object lens 95, an unwanted internal reflection signal will be generated, which, by traveling along the receiving beam path 92, is received by the laser receiver 97. Since the receiver 97 detects both the internal reflection and the reflected beam from the object to be measured, interference of the reflected lights occurs and the laser receiver 97 works improperly. This is particular true when the laser sight is used for close-quarters range finding, because the signal reflected by the object and the internal reflection signal are both very strong, causing a large electrical current in a light sensitive element (not show) of the laser receiver 97. The large current may easily result in a circuit saturation, which prevents the laser sight from working properly, or even damages the laser sight.

Hence, a method for eliminating internal reflection in a range finding system and a related signal processing method, to protect the laser sight, is required to overcome the above-mentioned disadvantages of the prior art.

SUMMARY OF THE INVENTION

The primary objective of the present invention is to provide a method for eliminating internal reflection of a range finding system.

The second objective of the present invention is to provide a signal processing method applicable in a range finding system of a laser sight to eliminate internal reflection of the range finding system, and thus protect the laser sight from interference of internal reflection in short-distance range finding.

The third objective of the present invention is to provide a range finding system, which applies the eliminating method to prevent interference caused by internal reflection.

In order to achieve the primary objective, a method for eliminating internal reflection in a range finding system is provided, comprising: (1) detecting an optical signal in the operation of the range finding system as a combination of an internal reflection signal induced by the internal reflection of the range finding system and a second light beam from an object as a reflection of a range-finding beam emitted from the range finding system; (2) converting the optical signal into an electrical current; (3) cropping the first electrical current in a time interval for the first electrical current to pass so as to extract a first electrical output which represents the internal reflection signal; and (4) subtracting the first electrical output from the electrical current to obtain a second electrical output representing the second light beam. As a consequence, an electrical signal representing the original range finding signal without internal reflection can be obtained.

In order to achieve the second objective, a signal processing method for a range finding system of a laser sight, comprising the following steps: (a) emitting a range-finding beam to an object, which in turn provides a reflected beam as a reflection of the range-finding beam; (b) receiving an optical signal as a combination of the reflected beam and an internal reflection signal; (c) converting the optical signal into an electrical signal; (d) cropping the electrical signal in a time interval for the first electrical signal to pass so as to generate a first output signal corresponding to the internal reflection signal; and (e) subtracting the first output signal from the electrical signal to generate an second output signal representing the reflected beam.

In order to achieve the third objective, a range finding system comprises a laser transmitter that emits a first laser beam toward an object, which reflects the first laser beam as a second laser beam; and a receiver that receives an optical signal as a combination of the second light beam from the object and an optical noise induced as an internal reflection of the range finding system. The receiver comprises a receiving circuit comprising an optical detector that detects the optical signal and, in response thereto, generates an electrical current; a time-depended switch that crops the electrical current in a time interval for the electrical current to pass so as to extracts a first electrical signal representing the optical noise from the electrical current; and a subtracter that receives both the electrical current and the first electrical signal and subtracts the first electrical signal from the electrical current to provide a second electrical signal representing the second light beam.

Other objects, advantages, and novel features of the invention will become more apparent from the following detailed description of a preferred embodiment when taken in conjunction with the accompanying drawings.

BRIEF DESCRIPTION OF THE DRAWINGS

The present invention may best be understood through the following description with reference to the accompanying drawings, in which.

DETAILED DESCRIPTION OF THE PREFERRED EMBODIMENT

Reference will now be made in detail to a preferred embodiment of the present invention.

Figure 1:
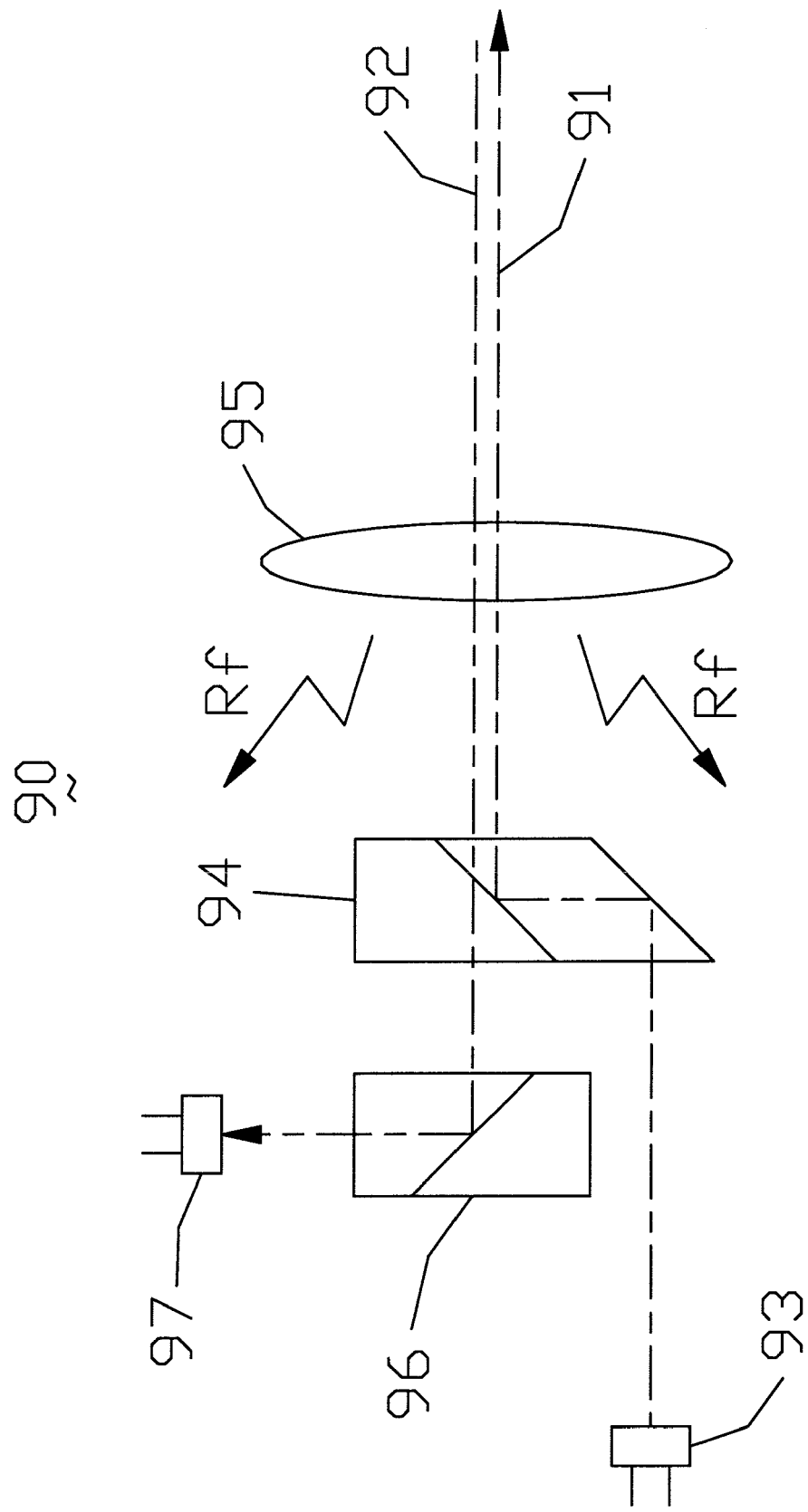
FIG. 1 is a schematic diagram of a range finding system of a conventional laser sight, showing a transmitting beam path and a receiving beam path.
Figure 2:
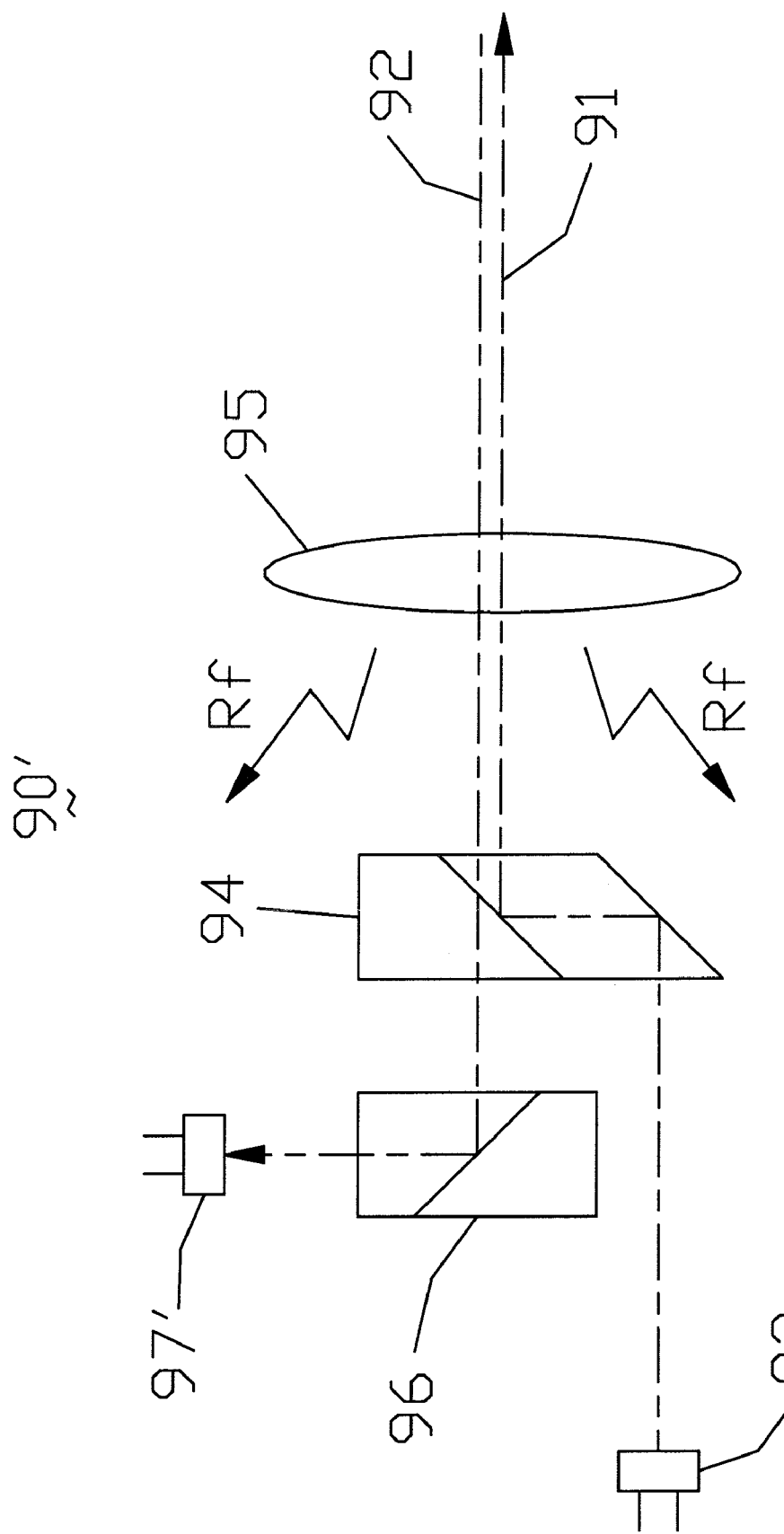
FIG. 2 is a schematic diagram of a range finding system of a laser sight in accordance with the present invention, which is similar to FIG. 1, except for a laser receiver thereof.

Referring to FIG. 2, a range finding system 90' in accordance with a preferred embodiment of the present invention is applicable a laser sight, and has a structure similar to the conventional range finding system 90 shown in FIG. 1. The range finding system 90' has a transmitting beam path 91 and a receiving beam path 92. The transmitting beam path 91 is formed with a laser transmitter 93 for transmitting a laser beam, a transmitting prism 94 for redirecting the laser beam, and an object lens 95 for transmitting the laser beams to an object (not shown). The receiving beam path 92 is formed with the object lens 95 for transmitting a beam reflected by the object, a receiving prism 96 for redirecting the reflected beam, and a laser receiver 97' for receiving the reflected beam after the beam is redirected by the receiving prism 96. As discussed previously, internal reflection occurring on for example the object lens 95 of the range finding system 90', which is indicated as an internal reflection signal Rf in the drawings is inevitably present in the range finding system 90'. The internal reflection signal Rf transmits along the receiving path 92 and is eventually received by the laser receiver 97'.

Figure 3:
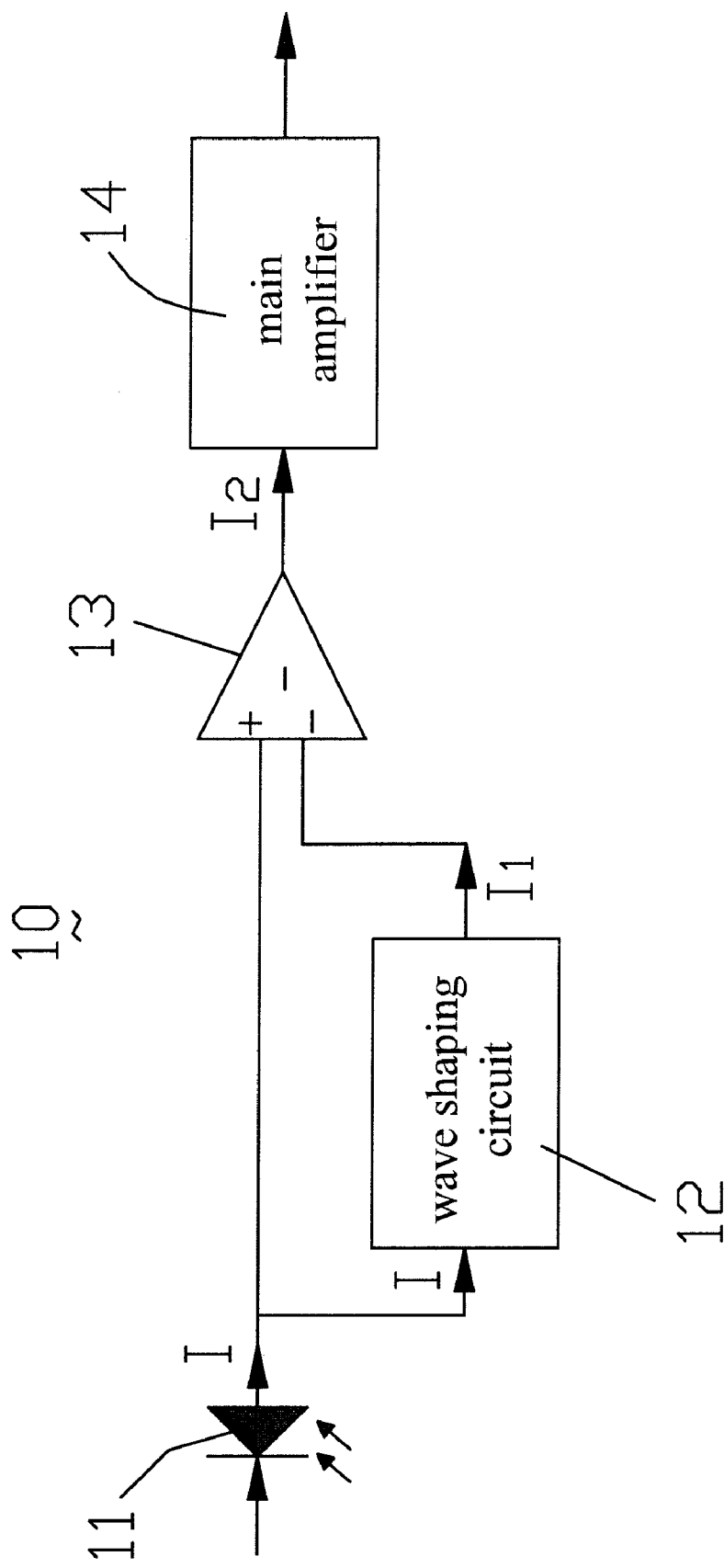
FIG. 3 is a circuit diagram of a receiving circuit of the laser receiver in accordance with the present invention.

Also referring to FIG. 3, the laser receiver 97' comprises a receiving circuit 10, which comprises a light sensitive element 11, a wave shaping circuit 12, and a subtracter 13. The light sensitive element 11 detects and converts an optical signal into an electrical signal. An example of the light sensitive elements 11 comprises a photodiode, such as an avalanche photoelectric diode (APD), which is used for optical detection and converting the detected optical signal into an electrical current I, which in accordance with the present invention, is applied to and processed by the wave shaping circuit 12. The optical signal or light received by the light sensitive element 11 includes a range-finding signal reflected by the object (that is the reflected beam from the object) and an internal reflection signal due to the internal reflection of the range finding system 90' (that is the internal reflection signal Rf caused by the object lens 95). The wave shaping circuit 12 receives and processes the current signal I and provides a first electrical output signal $I_1$ representing the internal reflection signal Rf. The subtracter 13 has two input terminals respectively receiving the current signal I from the light sensitive element 11 and the first electrical output signal $I_1$ from the wave shaping circuit 12, and an output terminal providing a second electrical output signal $I_2$ as a range finding signal, which equals to the difference between the current signal I and the first electrical signal $I_1$. Therefore, the internal reflection signal is eliminated by the receiving circuit 10 by subtracting the internal reflection from the reflected signal from the object, and a range finding signal without internal reflection signal is thus obtained.

Figure 4:
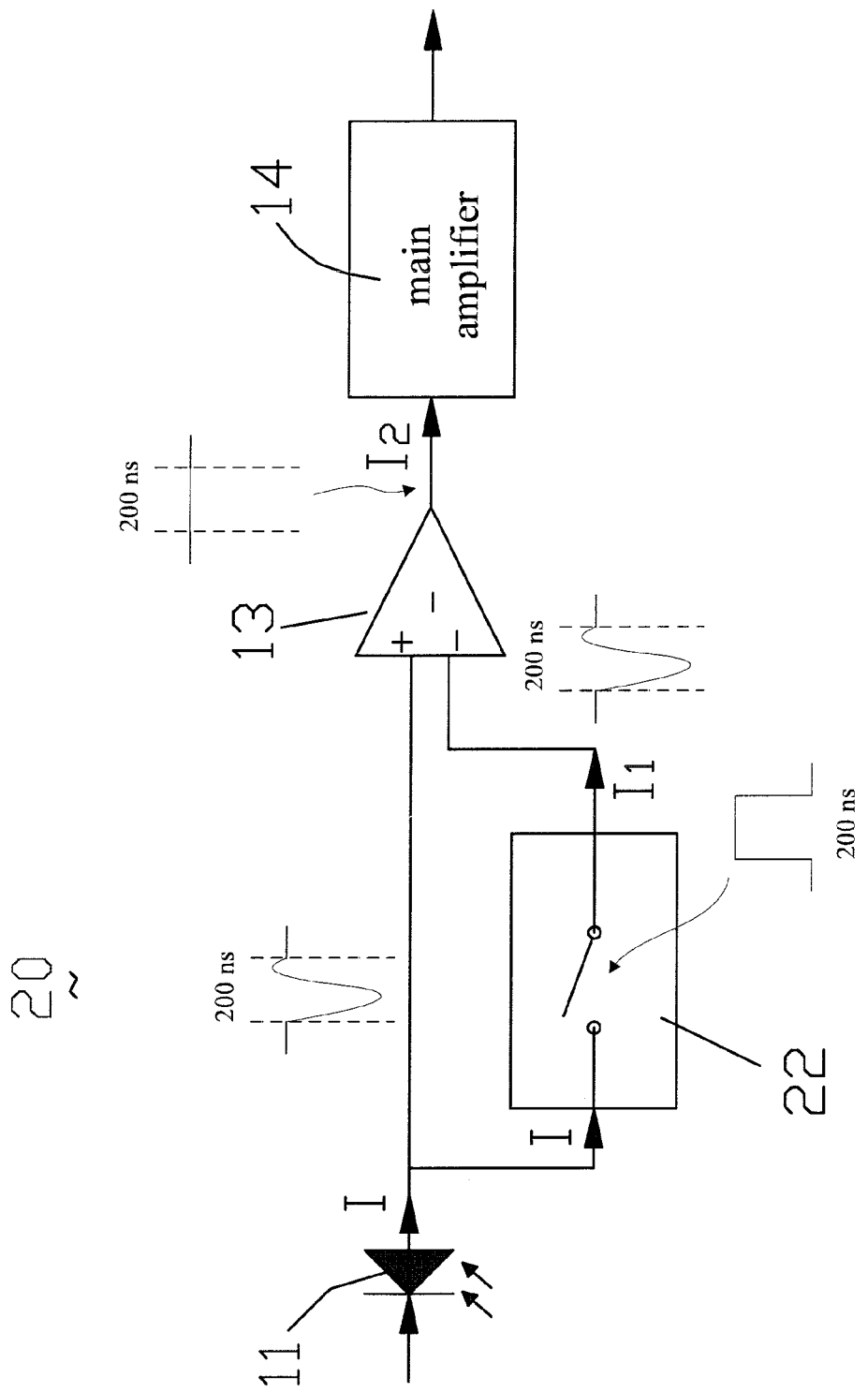
FIG. 4 is a circuit diagram of a receiving circuit of the laser receiver, which illustrates a time-depended switch as a preferred embodiment of a wave-shaping circuit in accordance with the present invention.

Further referring to FIG. 4, in a receiving circuit 20, a preferred embodiment of the wave shaping circuit 12 is to use a time-depended switch 22. Suppose that the electrical current I contains an internal reflection signal of a 200 ns period of time. When the 200 ns internal reflection signal passes through the time-depended switch 22, the time-depended switch 22, which closes for a period of 200 ns time interval as being properly controlled, crops the 200 ns internal reflection signal to generate an electrical output. After the subtracter 13 subtracts the electrical output from the 200 ns internal reflection signal, it results in a 200 ns zero-amplitude out. This cropping strategy reduces amounts of electrical current to avoid a circuit saturation, which prevents the laser sight or the range-finding system from working properly, or even damages them.

The second electrical output signal $I_2$ from the receiving circuit 10 is further connected to posterior circuits of the range finding system for further processing. For example, the second electrical output signal $I_2$ can be connected to a main amplifier 14 for amplification. Alternatively, the second electrical output signal can be applied to a current-to-voltage converter (not show), in which the current signal is converted to a voltage signal, and then the voltage is processed by the amplifier 14. The second electrical output signal $I_2$ may also be connected to an analog-to-digital (A/D) converter (not show) to be converted to a digital signal, and then provided to a microprocessor (not shown) for digital processing.

It is to be understood, however, that even though numerous characteristics and advantages of the present invention have been set forth in the foregoing description, together with details of the structure and function of the invention, the disclosure is illustrative only, and changes may be made in detail, especially in matters of material, plating method and manufacturing process within the principles of the invention to the full extent indicated by the broad general meaning of the terms in which the appended claims are expressed.

What is claimed is:

1. A method for eliminating internal reflection in a range finding system that transmits a first light beam along a first optic path to an object and receives a second light beam reflected by the object, internal reflection inducing by the first light beam in the range finding system being received by the range finding system as an internal reflection signal, the method comprising:

(1) detecting an optical signal in the operation of the range finding system as a combination of the internal reflection signal and the second light beam;

(2) converting the optical signal into an electrical current;

(3) cropping the electrical current in a time interval for the electrical current to pass so as to generate a first electrical output corresponding to the internal reflection signal; and (4) subtracting the first electrical output from the electrical current to obtain a second electrical output representing the second light beam.

2. The method as claimed in claim 1, wherein the detection of the optical signal is performed by a photodiode.

3. The method as claimed in claim 1, wherein cropping the electrical current is done by a time-depended switch.

4. The method as claimed in claim 1, wherein subtracting the first electrical output from the electrical current is done by a subtracter circuit.

5. The method as claimed in claim 1 further comprising a step of amplifying the second electrical output.

6. The method as claimed in claim 1 further comprising a step of converting the second electrical output into an electrical voltage.

7. The method as claimed in claim 1 further comprising a step of converting the second electrical output into a digital signal.

8. A range finding system comprising:
 a laser transmitter that emits a first laser beam toward an object, which reflects the first laser beam as a second laser beam; and
 a receiver that receives an optical signal as a combination of the second light beam from the object and an optical noise induced as an internal reflection of the range finding system, the receiver comprising a circuit comprising:
 an optical detector that detects the optical signal and, in response thereto, generates an electrical current,
 a time-depended switch that crops the electrical current in a time interval for the electrical current to pass so as to generate a first electrical signal corresponding to the optical noise, and
 a subtracter that receives both the electrical current and the first electrical signal and subtracts the first electrical signal from the electrical current to provide a second electrical signal representing the second light beam.

9. A signal processing method for a range finding system of a laser sight, comprising the following steps:
 (a) emitting a range-finding beam to an object, which in turn provides a reflected beam as a reflection of the range-finding beam;
 (b) receiving an optical signal as a combination of the reflected beam and an internal reflection signal;
 (c) converting the optical signal into an electrical signal;
 (d) cropping the electrical signal in a time interval for the electrical signal to pass so as to generate a first output signal corresponding to the internal reflection signal; and
 (e) subtracting the first output signal from the electrical signal to generate a second output signal representing the reflected beam.

10. The signal processing method as claimed in claim 9, wherein step (a) comprises providing a laser transmitter for emitting the range-finding beam and a laser receiver for receiving the reflected beam.

11. The signal processing method as claimed in claim 10, wherein the range-finding beam is transmitted from the laser transmitter to the object through a transmitting prism and an object lens along an optical path in which the internal reflection signal is introduced.

12. The signal processing method as claimed in claim 11, wherein the range-finding beam reflected by the object is transmitted to the laser receiver through the object lens and a receiving prism.

13. The signal processing method as claimed in claim 9, wherein step (d) comprises providing a time-depended switch for cropping the electrical signal.

14. The signal processing method as claimed in claim 9 further comprising a step of amplifying the second output signal.

15. The signal processing method as claimed in claim 9 further comprising a step of converting the second output signal to an electrical voltage.

16. The signal processing method as claimed in claim 9 further comprising a step of converting the second output signal into a digital signal.

* * * * *